Dec. 24, 1957    R. P. POWERS    2,817,381
TIRE AND RIM COMBINATION
Filed Feb. 16, 1953    3 Sheets-Sheet 2
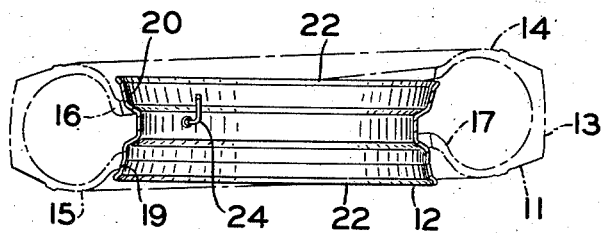
FIG-5
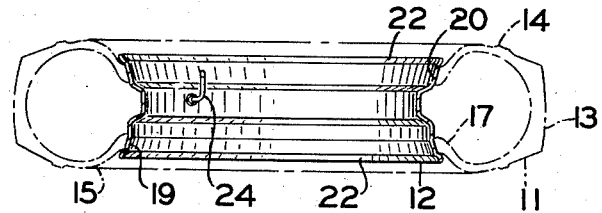
FIG-6
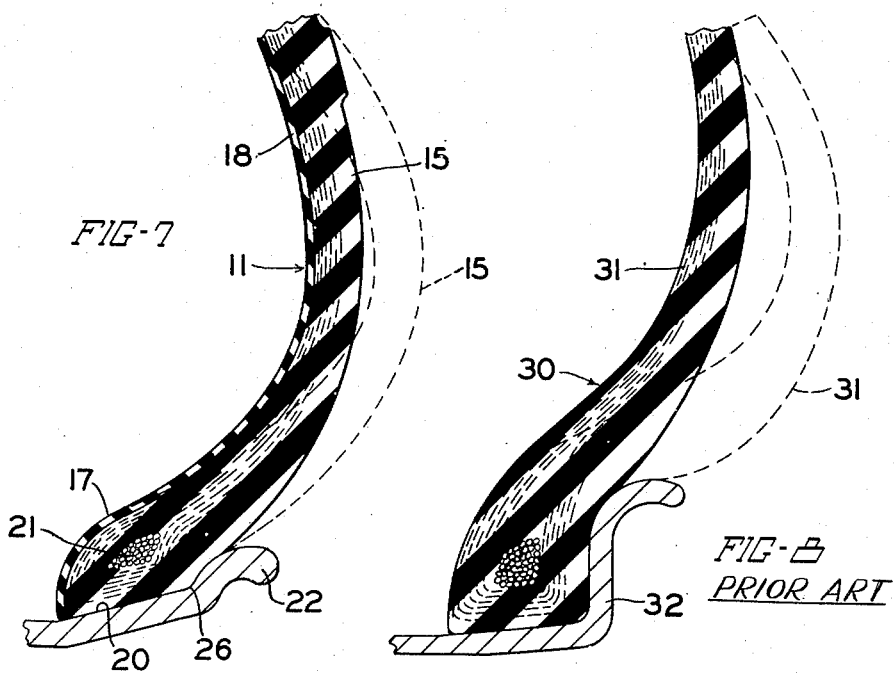
FIG-7
FIG-8
PRIOR ART
INVENTOR.
ROBERT P. POWERS
BY W. A. Fraser
ATTY.

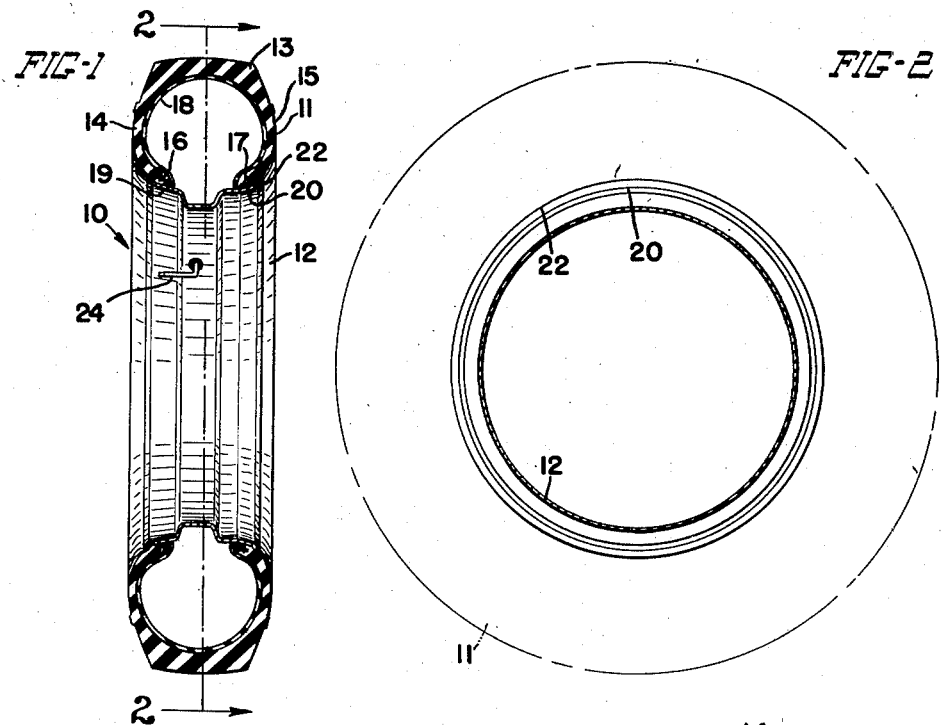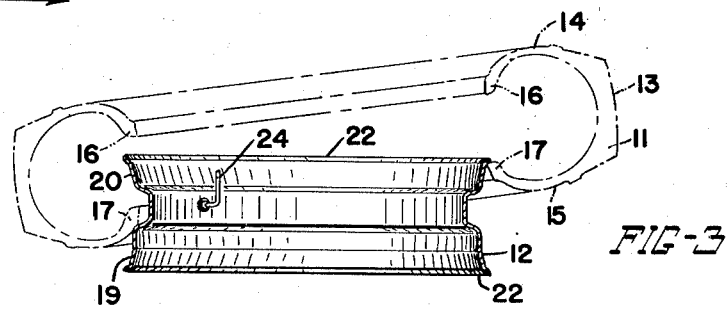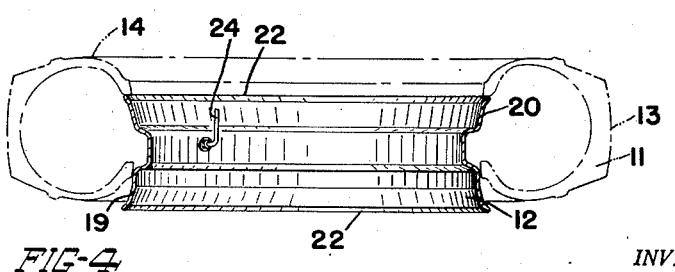

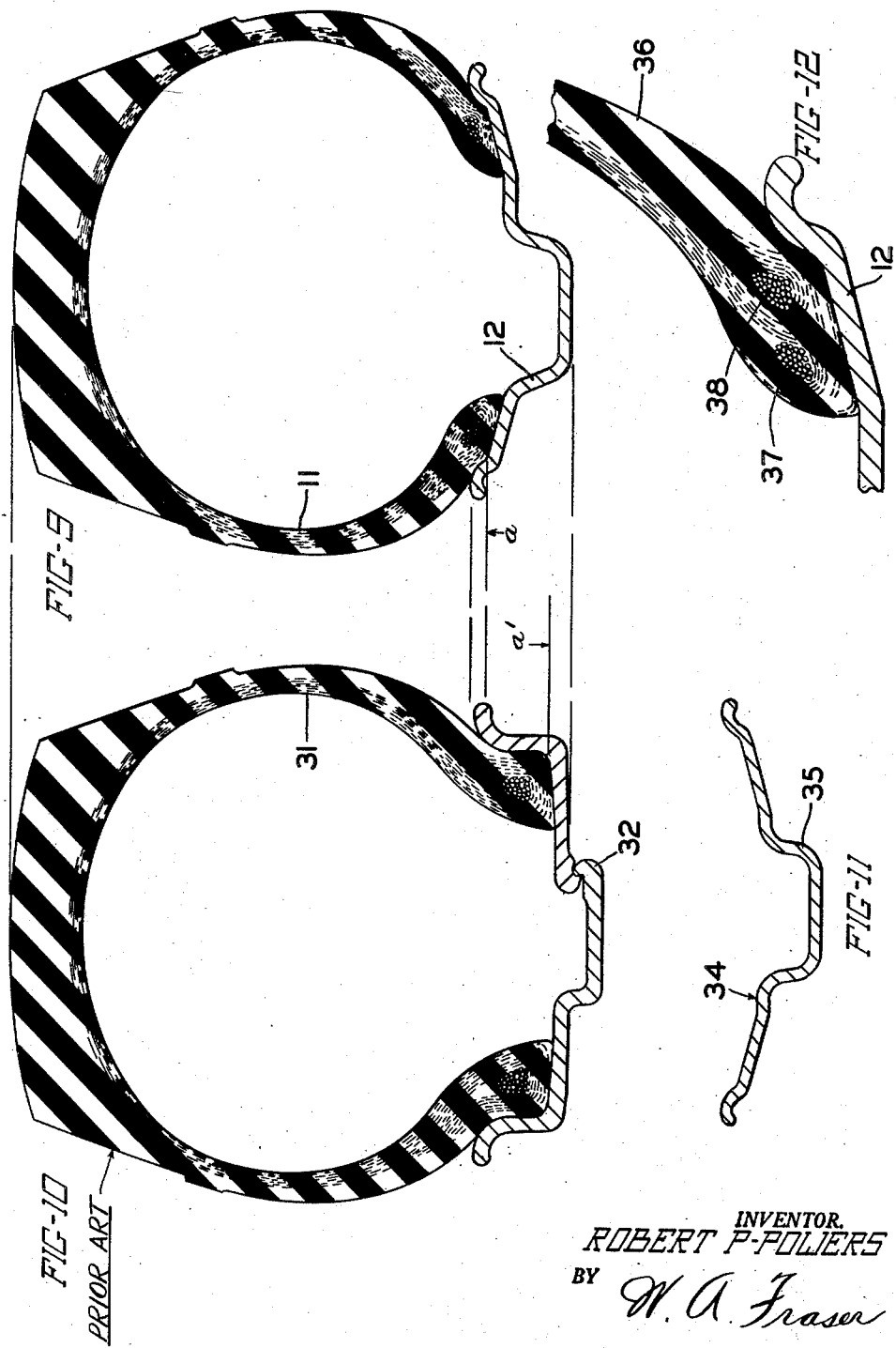

United States Patent Office 2,817,381
Patented Dec. 24, 1957

2,817,381

TIRE AND RIM COMBINATION

Robert Pope Powers, Akron, Ohio, assignor to The Firestone Tire & Rubber Company, Akron, Ohio, a corporation of Ohio Application February 16, 1953, Serial No. 337,158

3 Claims. (Cl. 152—381)

This invention relates to improvements in tires and also to an improved rim construction therefor.

When a tire is mounted on a rim, its beads are forced, by the inflationary air pressure within the tire, against the vertical surfaces of the rim flanges. The height of the flanges is approximately equal to the height of the substantially non-flexible portion of the tire bead for which the rim has been designed. Accordingly, in conventional pneumatic tire and rim assemblies, the sidewalls of a tire tend to be bent and flexed severely over the outer edges of the rim flanges when the tire is distorted by its road contact under load. Such flexing of the tire sidewalls over the rim flanges have many times resulted in failures at the beads. In the past, the incidence of such failures has been minimized by the use of stronger tire bead reinforcement in the form of tire bead inserts, flippers, chafers, etc., but until the present invention, fully satisfactory progress in preventing these bead failures had not been made. Moreover, such expedients have undesirably stiffened the sidewalls of the tires adjacent the beads.

The present invention has turned in a wholly different direction in solving this problem. Instead of attempting to stiffen the sidewalls of a tire, the invention contemplates a rim design having seats for the beads of a tire which are radically tapered so that the tire is supported almost wholly by the reaction of the beads with the rim seats rather than by the reaction of the beads with the rim flanges. A number of unexpected results flow from this new approach to the problem. The large taper of the rim seats, which is preferably in the order of 15°, requires that the tire beads be similarly tapered and the manner in which such beads function to hold the tire to the rim enables the beads to be lighter and much more flexible in construction than the usual tire beads of conventional prior art tires.

With such increased bead flexibility, it is possible to mount the beads of heavy truck tires over the flanges of the drop-center rim embodied in the present invention, a feat impossible to accomplish with present truck tires. Thus, applicant's one-piece drop-center rim can replace the two-piece and three-piece, and, indeed, in some cases, the four and five-piece truck rims in use today. The integral one-piece rim enables substantial savings in cost over the multi-piece rims and eliminates all the difficulties with tolerances and clearances which plague the manufacturers and users of such rims. Not only is there a savings in cost but the hazards and dangers which are often encountered in mounting and demounting heavy truck tires are completely eliminated. With the new drop-center truck rims, there is no locking ring to fly off into the face or body of the user. Yet, another advantage results from the invention. The reaction of the tire upon the new rim is such as to produce more favorably stresses in the rim with the result that the rim can be made lighter in section with consequent savings.

It is a general object of the present invention therefore to provide a tire rim having tire bead seats so formed as to provide lateral support to a tire almost wholly over the radial inner surfaces of the tire beads with the side flanges of the rim functioning principally to center the tire on the rim rather than to provide substantial lateral support.

Another object is to provide a tire so constructed at its bead portions that the strain on the cords of the tire plies at the beads is exerted substantially longitudinally of the cords and axially of the tire while avoiding the severe bending and flexing of the cords over the flanges of the rim.

A further object is to provide a tire having a lower section height, thereby cutting cost, while at the same time improving the stability and other performance characteristics of the tire.

Yet another object is to provide a tire having more flexible beads which makes possible the use of one-piece, drop-center rims with larger and heavier tires than has been possible heretofore.

Still another object is to provide a drop-center rim and a tubeless tire so designed that the inflationary air of the tire forces the tire beads on their rim seats in air-tight relation therewith.

These and other objects of the invention will become apparent from the following description of the invention, taken in connection with the accompanying drawings, in which:

Figure 1 is a transverse section of a rim and tire assembly embodying the invention;

Figure 2 is a sectional view taken in the plane indicated by the lines 2—2 of Figure 1, the tire being shown in phantom so that the rim construction will be more clearly seen;

Figures 3, 4, 5 and 6, respectively, illustrate the successive steps in mounting the tire of Figure 1 on the rim;

Figure 7 is an enlarged fragmentary sectional view showing the manner in which the beads of the tire of Figure 1 seat on the rim and illustrating, by broken lines, the manner in which the tire deflects under load;

Figure 8 is a view similar to Figure 7, showing a conventional tire and rim for comparison with Figure 7;

Figure 9 is a transverse sectional diagrammatic view in an enlarged scale illustrating the tire and rim assembly of the invention as shown in a small scale in Figure 1 and as a partial sectional view of Figure 7;

Figure 10 is a similar transverse sectional diagrammatic view in the same scale as Figure 9, illustrating a conventional tire and rim assembly with construction lines to indicate the differences in diameters of the tire and rim with respect to corresponding portions of those of Figure 9;

Figure 11 is a transverse sectional view illustrating the invention applied to a drop-center rim with the well located at the center of the rim; and Figure 12 is a fragmentary, sectional view of a tire having a double bead mounted on a rim.

Referring more particularly to the drawings, a preferred form of the invention is shown in Figures 1 and 2 as embodied in a tire and rim assembly generally designated as 10, comprising an improved tubeless tire 11 and improved rim 12.

The tire 11 comprises the usual tread portion 13, sidewalls 14 and 15 and bead portions 16 and 17. The body of the tire is of the usual construction, being made of rubberized cord fabric with the cords of alternate plies crossing each other at approximately right angles, although it is to be understood that these angles will vary at different parts of the tire and that other angles may be satisfactory. As is usual with tubeless tires, an air-impervious inner liner 18 of butyl rubber is provided.

The tire is of novel construction in that the tire beads 16 and 17 have a considerably greater diameter than the beads of conventional tires of comparable rating. Moreover, the bead portions constitute a radical departure from the prior art, in that the radial inner surfaces of the beads, which seat upon the bead seating surfaces 19 and 20 of the rim, are formed at an angle greater than 12° and preferably in the range of about 15° to 20°. The bead portions have the usual inextensible wire reinforced cores 21 and the plies of the tire are folded about the cores in the usual manner.

As shown in Figure 6, the beads of the tire come into forcible contact with the seats just before they contact the bead-aligning flanges 22 of the rim. In the last increment of movement on the seats, the beads are stressed until about 85–90% of the required lateral support is provided, leaving the last 10–15% of lateral support to be given to the beads by the said flanges. By thus reserving a small fraction of the bead supporting function to the flanges, the tire is prevented from becoming misaligned both laterally and eccentrically, for it will not lock on the tapered seats until it contacts the flanges.

The taper of the bead seats may be as low as 12°, but a range of 15° to 20° gives the best results. Below 12°, insufficient axial support is given by the bead seats, while above 20° the stresses on the rim are such as to require an excessively heavy section. An important advantage of the present construction is that since the flanges 22 give only a minimum of axial support to the tire beads, preferably about 10% of the total required, the flanges may be low in height and slanted outwardly as shown. Hence, the bending movement on the flanges is held to a minimum, and, accordingly, the rim at the junction of the flanges 22 and seats 19 and 20 need not be heavy to resist the bending stresses. This is in contrast to the prior art rims which have relatively large bending forces imposed on rim side flanges.

The steps in mounting the tire 10 upon the rim 12 follow the conventional method for drop-center rims, see Figures 3–6, inclusive. The first step is to place rim 12 horizontally upon any suitable support with the off-center well nearest the top of the rim. One bead 16 of the tire is then placed on the rim by inserting a portion of the bead into the well while the diametrically opposite portion of the bead is forced over the edge of the rim, see Figure 3. With the first bead over the edge of the rim as shown in Figure 4, the second bead 17 is passed over the flanges of the rim, see Figure 5, in a manner similar to that just described for bead 16. With both beads of the tire disposed between the rim flanges, the beads will usually take the position shown in Figure 6. If the beads do not take this position, it may be desirable to pass a band around the tread of the tire and tighten it to draw the tread of the tire radially inwardly and thus spread the beads outwardly into contact with the seats. With the tire in this position, the tire is inflated by passing air under pressure into the tire by means of the valve 24, which is a conventional valve for tubeless tire rims. The air pressure forces the beads 16 and 17 of the tire laterally outwardly upon their bead seats 19 and 20, respectively, until they occupy the position shown in Figure 1.

Due to the taper of the radial inner surfaces of the tire beads 16 and 17, forcible contact between the tire beads and their rim seats occurs just before the heels 26 of the tire beads contact the lateral inner faces of the rim flanges 22. Further outward movement of the beads will cause them to tighten upon the rim and as the tire is pressed into its ultimate position, this tightening will be sufficient to give axial support to the tire, and in addition to ensure an air-tight seal between the beads of the tire and the rim. By leaving a small part of the axial support for the flanges 22, correct alignment of the beads is ensured, for the beads will move outwardly until they are fully supported, i. e. until they make contact with the flanges throughout the circumferential extent of the beads.

Figure 7 illustrates, in solid lines, the relative positions of the tire and rim assembly 10 when the tire is inflated and not under load, and shows, in dotted lines, the flexed position of the tire when it is in ground contact under load. It is to be noted that even though the beads of the tire contact the flanges of the tire rim, the direction of the cords composing the tire, does not change materially when the tire is flexed. Moreover, there is no extreme or undesirable localized flexing over the rim flanges, and it is therefore not necessary to stiffen and reinforce the tire beads with fabric inserts, heavy chafer strips, and the like. For comparison, the flexure or bending of the sidewall of a conventional tire and rim assembly 30 is illustrated in Figure 8 by broken lines. It will be noted that the conventional tire of Figure 8 bends abruptly over the rim flange. It has been found by experience that if the bead portion of the tire is permitted to flex over a flange, as shown, the tire will "rim-cut." Until the present invention, the only way this extreme localized bending of the sidewall could be avoided was by making the bead portion and lower sidewall of the tire extremely stiff for a substantial distance above the wire reinforcement of the bead. However, a stiff bead sacrifices performance in the tire and it is expensive to build.

In Fig. 9, the assembly of the tire 11 and rim 12, embodying the present invention, is shown in cross section on an enlarged scale. Fig. 10 illustrates a conventional tire 31 mounted on a two-piece truck rim 32 the assembly being illustrated in the same scale as Fig. 9. The prior art conventional truck tire and rim assembly of Fig. 10 is shown along side of the tire and rim assembly of the present invention for ready comparison of the tire and rim assembly sections representing tires of the same comparative size in width and overall diameter and being relatively positioned with respect to the same axis of rotation. Horizontal construction lines are provided to show the comparative diameters of the corresponding parts of the tire and rim of the invention with those of the tire and rim of the prior art. It will be seen that the bead seat diameter, as shown by construction "a," of the rim 12, is of greater diameter than the diameter, as indicated by the construction line "a'," of the conventional truck rim 32, but that this difference is made up by the difference in the diameter of the bead portions of the tires. It will be seen that the present invention enables a savings in rim section thickness as compared with the rims of the prior art because bending stresses are minimized in the present rim. It will also be seen that the sidewalls of the tire are reduced in height with consequent savings in manufacturing costs of the tire.

Figure 11 illustrates a rim, referred to generally as 34, which is similar to rim 12, but differs in having its well 35 located midway between the tire bead seats. Rim 34 has the same advantages and functions in the same manner as rim 12 and finds its greatest use with automobile tires.

In Figure 12 a tire indicated at 36 having a double bead is shown mounted on the rim 12 of the present invention. The inextensible wire portions of the double bead indicated at 37 and 38, respectively, have different diameters with the outer core 38 being substantially greater in diameter than the inner core 37. With this difference in core diameters, it is possible to obtain the desired taper of about 15° in the bead seats according to the present invention. It will be noted that with a double bead, the number of plies wrapped about the core is substantially reduced, as compared with an equivalent bead having a single core, and that the cores are correspondingly closer to the bottom of the bead. Such a construction ensures a secure seating of the bead on the rim seats.

It will be apparent that various modifications can be made without departing from the spirit and scope of the invention. For example, the portion of the supporting function assigned to the side flanges will vary with the angle, the lesser the angle the more support the side flange will give to the tire. Thus, the percentages noted above are not critical but are to be taken as guides only.

The detailed description of the invention illustrated and described herein is not to be construed as limiting the invention thereto. The invention includes all features of patentable novelty residing in the foregoing description and the accompanying drawings, and summarized in the appended claims.

In some cases it may be desirable to have the angle of the beads of the tire somewhat greater than the angle of the rim seats so that when the beads are mounted on the rim the toes of the tire will be compressed somewhat more than the heels of the tire beads and thus seat securely on the rim. This minimizes any chance of bead movement with respect to the rim.

Although the invention has been described and illustrated with reference to a drop-center rim, it will be apparent that the advantages and results of the invention can be obtained with other type rims such as, for example, any one of the removable flange rims which would have to be used with tires of such exceptionally heavy size that they cannot be mounted on a drop-center rim, even with the flexible beads of the present invention.

What is claimed is:

1. In combination, a one-piece drop-center rim having a pair of oppositely inclined conical bead seating surfaces extending at an angle of about 12° to 20° to the axis of the rim and terminating in low radially extending outwardly inclined bead-aligning flanges and a pneumatic tire mounted on said rim with the beads of said tire seated on said seating surfaces and bearing against said flanges, said beads being molded to have a major portion of the radially inner surfaces thereof inclined at an angle substantially equal to the angle of said bead seating surfaces and to be of such a diameter relative to the diameter of said conical bead seat surfaces that the inner surfaces of said beads contact the conical bead seats before said beads contact said flanges as the tire beads are being moved generally axially outwardly into operative position on said rim by the tire inflationary air during mounting of the tire on the rim, whereby a tight compression fit with said seating surfaces is effected and the major lateral thrust of said tire, when said tire is inflated, is resisted by the reaction of the bead portions with said seating surfaces and the balance of said thrust is resisted by said bead-aligning flanges.

2. In combination, a drop-center rim having a pair of oppositely inclined conical bead seating surfaces extending at an angle of about 14° to 16° to the axis of the rim and terminating in low radially extending outwardly inclined bead aligning flanges and a pneumatic tire mounted on said rim with the beads of said tire seated on said seating surfaces and bearing against said flanges, said beads being molded to have a major portion of the radially inner surfaces thereof inclined at an angle substantially equal to the angle of said bead seating surfaces and to be of such a diameter relative to the diameter of said conical bead seat surfaces that the inner surfaces of said beads contact the conical bead seats before said beads contact said flanges as the tire beads are being moved generally axially outwardly into operative position on said rim by the tire inflationary air during mounting of the tire on the rim, whereby a tight compression fit with said seating surfaces is effected and the major lateral thrust of said tire, when said tire is inflated, is resisted by the reaction of the bead portions with said seating surfaces and the balance of said thrust is resisted by said bead-aligning flanges.

3. A combination as recited in claim 1 wherein not less than 85 percent of the thrust of said tire, when said tire is inflated, is resisted by the reaction of the bead portions with said seating surfaces and the balance of said thrust is resisted by said bead-aligning flanges.

References Cited in the file of this patent

UNITED STATES PATENTS

| | | |
|---|---|---|
| 1,639,573 | Michelin | Aug. 16, 1927 |
| 1,756,655 | Shoemaker | Apr. 29, 1930 |
| 1,822,320 | Shoemaker | Sept. 8, 1931 |
| 1,919,911 | Shoemaker | July 25, 1933 |
| 2,219,156 | Yankee | Oct. 22, 1940 |

FOREIGN PATENTS

| | | |
|---|---|---|
| 626,214 | France | May 7, 1927 |